Oct. 19, 1965  E. V. GARNETT  3,212,604
EXTENSIBLE DERRICK
Filed April 9, 1962  11 Sheets-Sheet 1

FIG. 1.

INVENTOR.
EDWARD V. GARNETT
BY
  Horace B. VanValkenburgh
  Gary D. Fields
    ATTORNEYS Oct. 19, 1965  E. V. GARNETT  3,212,604
EXTENSIBLE DERRICK
Filed April 9, 1962  11 Sheets-Sheet 2

FIG. 2.

INVENTOR.
EDWARD V. GARNETT
BY Horace B. Van Valkenburgh
Gary D. Fields
ATTORNEYS Oct. 19, 1965

E. V. GARNETT 3,212,604

EXTENSIBLE DERRICK

Filed April 9, 1962

INVENTOR.
EDWARD V. GARNETT
BY Homer B. Van Valkenburgh
Gary D. Fields
ATTORNEYS Oct. 19, 1965    E. V. GARNETT    3,212,604
EXTENSIBLE DERRICK Filed April 9, 1962    11 Sheets-Sheet 5

FIG. 6.

INVENTOR.
EDWARD V. GARNETT
BY
ATTORNEYS

Oct. 19, 1965      E. V. GARNETT      3,212,604

EXTENSIBLE DERRICK

Filed April 9, 1962      11 Sheets-Sheet 11

INVENTOR.
EDWARD V. GARNETT
BY
ATTORNEYS

United States Patent Office 3,212,604
Patented Oct. 19, 1965

3,212,604
EXTENSIBLE DERRICK
Edward V. Garnett, Denver, Colo., assignor to Eaton
Metal Products Company, a corporation of Nebraska
Filed Apr. 9, 1962, Ser. No. 186,145
21 Claims. (Cl. 182—51)

This invention relates to an extensible derrick having a telescopic boom, and more particularly to such a telescopic boom having at least three stages and also adapted to be mounted on a vehicle, such as a truck.

When an extensible derrick is mounted on a vehicle, such as a truck, the folded or retracted length of the boom is normally limited to the length of the vehicle. A two stage boom is readily made from telescoping hydraulic cylinders, but is limited in the height which can be reached, because of the limited length of the truck on which the boom is mounted, as the telescoping portions can only be of a corresponding length. Furthermore, in a telescopic boom which has at least three extensible portions or stages and comprises a series of telescoping hydraulic cylinders of decreasing size, mounted in axial relationship and extended in succession, the outer cylinder is quite small in size, and is quite limited in the load which may be moved and supported. In addition, there are numerous problems of supplying and removing hydraulic fluid from each end of each stage, in the event each stage is to be double acting and thus retracted by hydraulic fluid as well as extended. Further problems are involved when a workman's cage or basket is mounted on the outer end of the boom, since the basket must be maintained in operative position, irrespective of the angular position of the boom, and to enable the ultimate height to be reached, the basket should be above the upper end of the boom, rather than below it.

Among the objects of this invention are to provide a telescopic boom having two or more extensible portions or stages; to provide such a boom which is constructed to support relatively large or heavy loads at the outer end thereof; to provide such a boom which is operated by means of double acting hydraulic cylinders; to provide such a boom in which the cylinders are of sufficient size to support and move the desired load; to provide such a boom in which an adequate supply of hydraulic fluid to each end of each of the cylinders is assured, as well as removal of hydraulic fluid therefrom; to provide such a boom which will maintain a workman's basket mounted on the outer end thereof in operative position at all times, regardless of the angular position of the boom; to provide such a boom which may include means for supplying water at the end of the boom, as for use in fire fighting; and to provide such a boom which is of simple construction, yet durable and rugged.

Additional objects and the novel features of this invention will become apparent from the description which follows, taken in conjunction with the accompanying drawings, in which.

Figure 1:
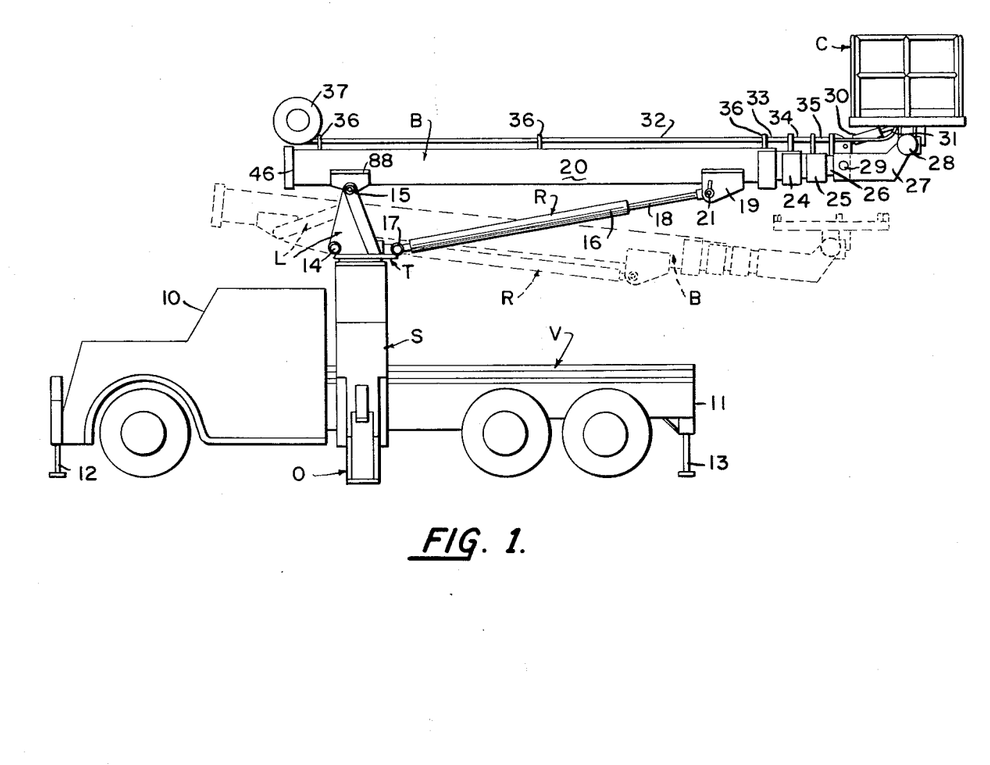
FIG. 1 is a side elevation of a vehicle provided with a derrick constructed in accordance with this invention, the boom thereof being in a position preparatiory to erection and the storage position being shown in dotted lines.

A derrick constructed in accordance with this invention, as illustrated in FIG. 1, may be mounted on a vehicle V, having a cab 10 and a body 11. The derrick may include a boom B, shown in solid lines in position just prior to erection and pivotally attached to a bracket lever L, which in turn is pivotally mounted on a turntable T, supported by a superstructure S mounted on the vehicle. At each side, the superstructure S may be provided with an outrigger O adapted to extend downwardly and outwardly at each side of the vehicle so as to provide lateral support for the vehicle, particularly in the event that the load is being handled at one side or the other thereof. Lever L, turntable T, superstructure S and outriggers O are conveniently constructed as disclosed in my copending application Ser. No. 731,485, filed April 28, 1958, now Patent No. 3,056,510. Because boom B is capable of extension through a considerable distance, such as 80 feet, jacks 12 and 13, respectively, are provided at the front and rear of vehicle V to relieve the forces exerted on the truck springs when the boom is extended either to the front or rear of the vehicle. The outer end of boom B, if desired, may be provided with a workman's cage C. The boom B conveniently comprises three inner telescopic sections, telescoped into a fourth or outer section, and may be connected with turntable T by a hydraulic cylinder assembly or leg R, so that the boom may be raised and lowered to any desired angular position, such as the fully extended position of FIG. 2. As will be evident, with the boom in the storage position, shown in dotted lines in FIG. 1, when hydraulic leg R is extended, the bracket lever L will pivot on a pin 14 from the storage or dotted position to the up or full line position, so as to place the pivot axis of boom B, as at pin 15, more directly above turntable T. Bracket lever L is locked in the vertical position of FIG. 1, as by locking means described in my above mentioned copending application Ser. No. 731,485. Conveniently, the inner end of cylinder 16 of the hydraulic leg R is pivotally connected to turntable T by means of a pivot pin 17, while the outer end of its piston rod 18 is pivotally attached to a bracket 19 mounted on the underside of an outer boom section 20, as by a pin 21 which extends through a sleeve 22 attached to opposite sides of bracket 19, as shown more clearly in FIG. 5, and reinforced by gussets 23. Outer boom section 20 is conveniently rectangular in cross section and receives for telescopic movement an intermediate boom section 24 of similar cross section, which in turn telescopically receives another intermediate boom section 25. Similarly, an inner boom section 26 is telescopically received in section 25 and has a dog leg 27 bolted to the outer end thereof, which pivotally supports cage C on a pivot pin 28. The dog leg 27 may be provided with an access hole 29, adjacent the inner end thereof, for convenience in assembly and maintenance. Advantageously, the cage C is maintained in an upright position at all times, regardless of the position of the boom, as by a hydraulic cylinder 30 connected between cage C and dog leg 27, as in FIGS. 1 and 2.

Conveniently, the boom may be controlled from cage C by controls which are mounted in the cage and are connected to the operative parts of the superstructure by a cable 31, which extends through telescoping tubes 32, 33, 34 and 35 attached to the upper ends of the respective boom sections, as by brackets 36. Cable 31 is conveniently wound on a reel 37, mounted at the inner end of outer boom section 20.

Figure 3:
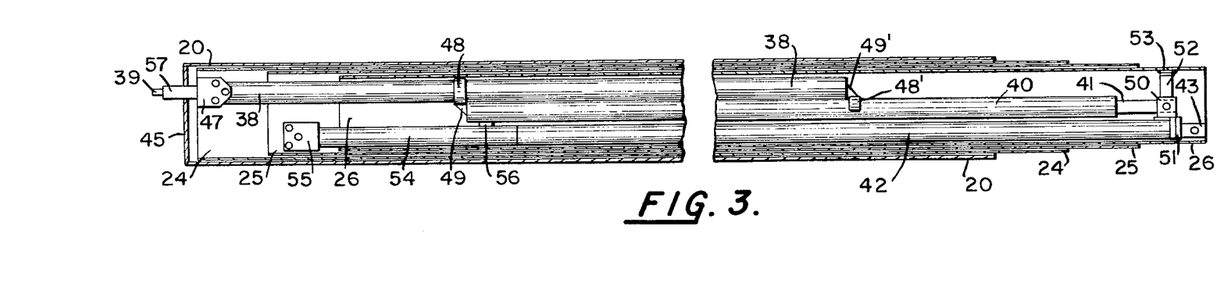
FIG. 3 is a longitudinal, condensed section of the boom, in telescoped position, showing the positions of a hydraulic cylinder assembly and connections to the interfitting boom sections.
Figure 4:
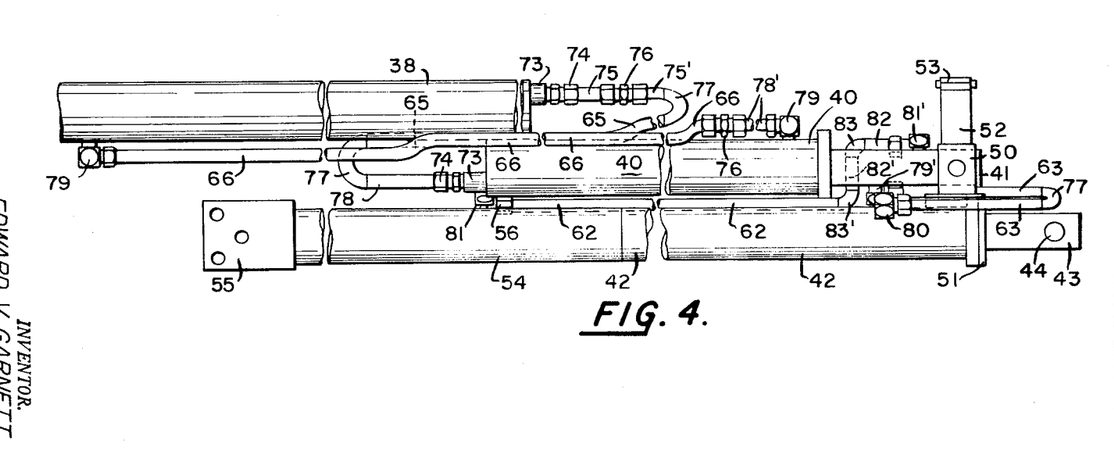
FIG. 4 is a condensed side elevation, on an enlarged scale, of the hydraulic cylinder assembly of FIG. 3.
Figure 5:
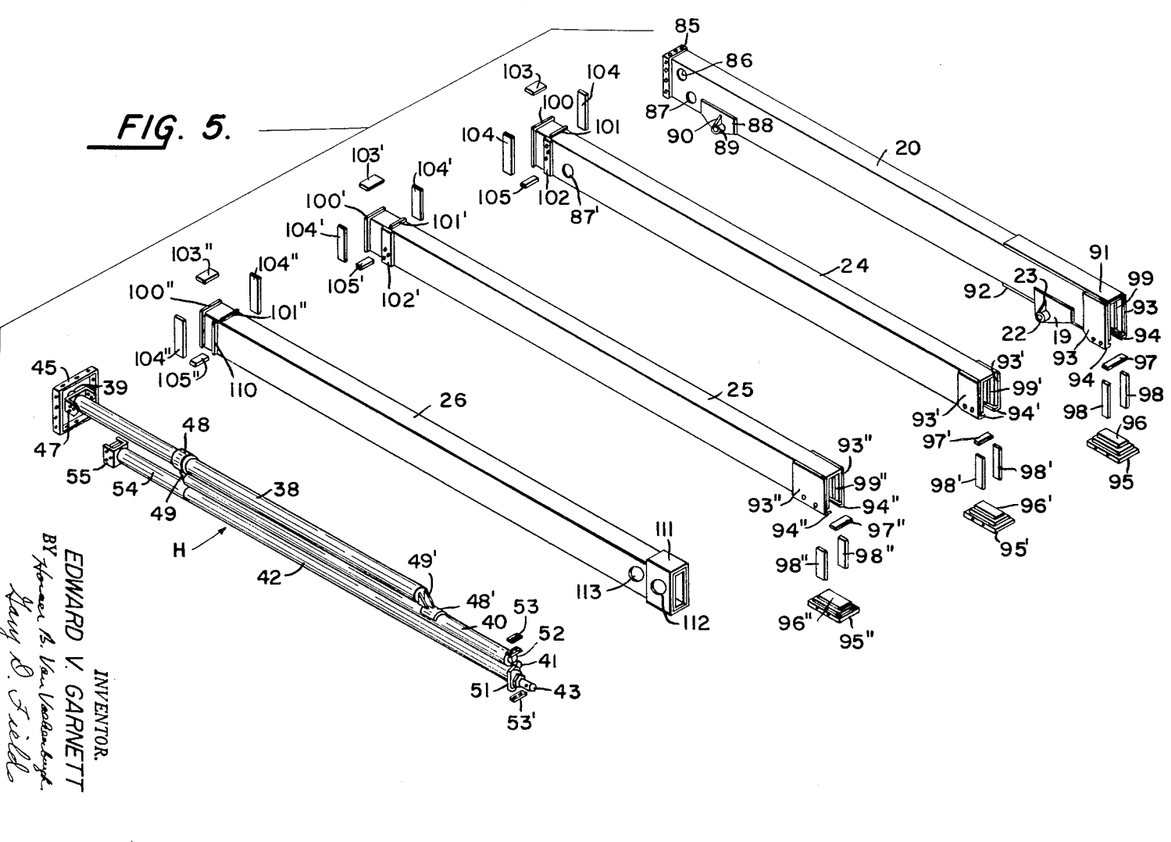
FIG. 5 is an exploded perspective view of the hydraulic assembly, boom sections, and associated parts of FIG. 3.

The telescoping boom sections are moved inwardly and outwardly by a hydraulic cylinder assembly H of FIG. 4 and shown also in FIGS. 3 and 5, which includes a first cylinder 38, attached at its inner end to the inner end of boom section 24 and having an inwardly extending piston rod 39, the inner end of which is connected to the inner end of outer boom section 20. First cylinder 38 is attached to a second cylinder 40, having an outwardly extending piston rod 41 attached to the outer end of a third cylinder 42, in turn attached at its inner end to intermediate boom section 25 and having an outwardly extending piston rod 43 attached to the outer end of inner boom section 26. The boom sections will often move in accordance with the load or resistance, usually less for the inner boom section 26 and progressively greater for the other boom sections, although they may move outwardly or inwardly together, or the resistance to movement of one section may be less than the resistance to movement of other sections due to difference in slides and the like, in which case the one will move before the others. However, assume that the first condition to be true and the hydraulic pressure, tending to extend the piston rods from the respective cylinders, to be exerted in all cylinders. Then, from the position shown in FIG. 3, the inner boom section 26 will be extended through its connection to the outer end of piston rod 43 as the latter is extended; then upon extension of piston rod 41, second cylinder 42 will extend with it and extend intermediate boom section 25; and then as piston rod 39 extends rearwardly, boom section 24 will be moved outwardly. Of course, outer boom section 20 will remain stationary relative to bracket lever L, while boom sections 25 and 26 will move outwardly with boom section 24, when the latter moves outwardly; and, similarly, inner boom section 26 will move outwardly with boom section 25, when the latter moves outwardly. Thus, full extension of the boom will be only a short distance less than four times the length of the collapsed boom sections, such as a collapsed length of 22 ft. 4 in. and a fully extended length of 82 ft.

Figure 2:
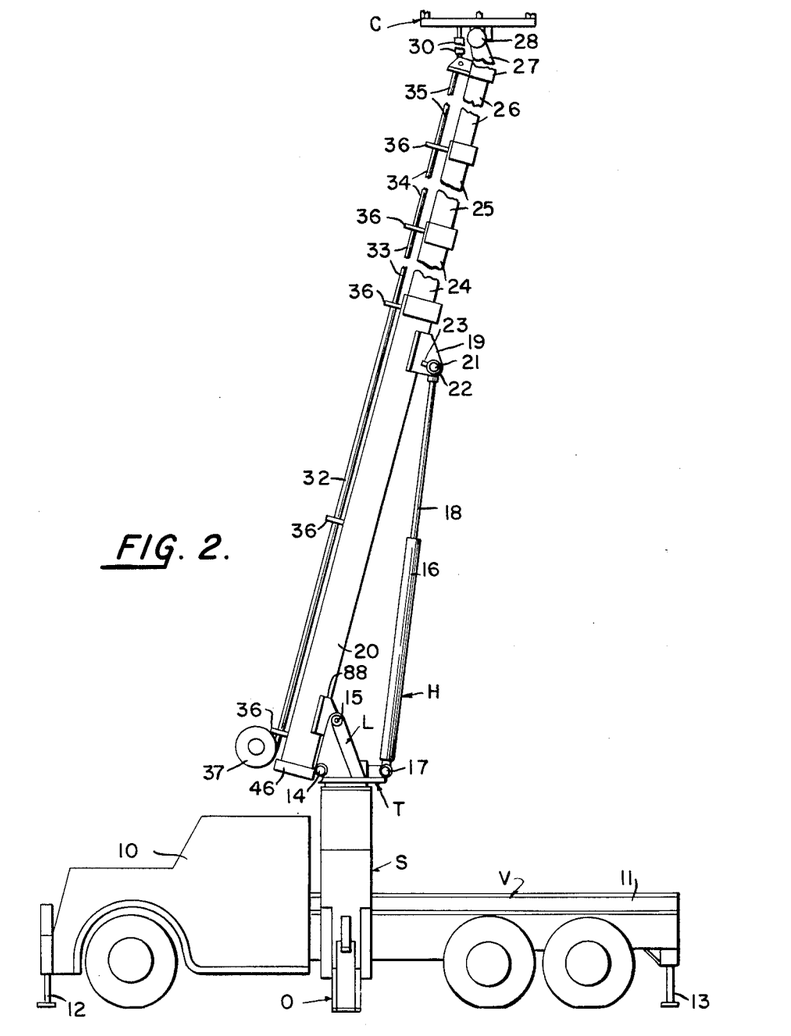
FIG. 2 is a condensed, side elevation of the vehicle and derrick of FIG. 1, with the boom raised to its uppermost, extended position.

For attaching the various cylinders and piston rods to the respective boom sections, the rear end of piston rod 39 may be provided with a rectangular mounting plate 45 of FIG. 5, which has an inturned flange which may be bolted to an end cap 46 on the inner end of boom section 20, shown in FIGS. 1 and 2, while cylinder 38 may be provided at its inner end with a bracket 47, shown in FIGS. 3 and 5, for attachment to the inner end of boom section 24. Cylinder 38 is fixedly connected to cylinder 40 by a collar 48 welded thereto, which encompasses cylinder 38 and is attached to a pair of gussets 49 attached to the inner end of cylinder 40, as by welding; and further by a semicircular collar 49 welded to the upper surface of cylinder 40 and also welded to a pair of gussets 49' in turn welded to the outer end of cylinder 38. The outer end of piston rod 41 for cylinder 40 is received in a sleeve 50 which is connected to an end cap 51 for cylinder 42 and, to guide piston rod 41 in sliding movement along inner boom section 26, sleeve 50 is provided with an upwardly extending arm 52 provided with a slide 53 on the outer end thereof for engagement with boom section 26. Additional details of the construction of end cap 51, arm 52 and slide 53 will be described later. Since the effective length of piston rod 43 is less than the distance between the outer end of boom section 26 and the inner end of boom section 25, third cylinder 42 is conveniently provided with an inner dummy or extension cylinder 54 welded to the inner end thereof and attached to boom section 25 by a bracket 55 attached to the inner end of dummy cylinder 54, which is also provided with a slide 56 which engages second cylinder 40 to facilitate relative movement between the second and third cylinders. Piston rod 43 is attached to a sleeve (not shown) within dog leg 27 which in turn is connected to the outer end of boom section 26, as described above, so that boom section 26 moves with piston rod 43.

Figure 6:
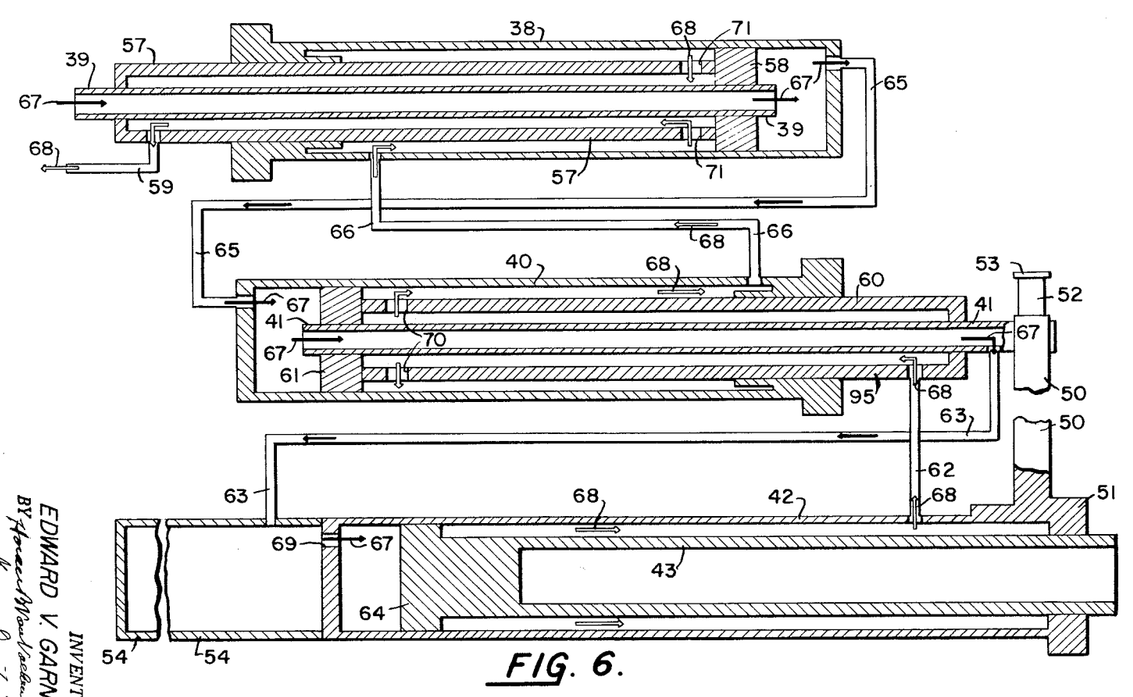
FIG. 6 is a schematic diagram illustrating hydraulic fluid flow through and between the cylinders of the hydraulic assembly.

Although details of the construction of the piston rods are described later, the piston rods 39 and 41, as illustrated diagrammatically in FIG. 6, are tubular and are also surrounded by spaced sleeves, closed at one end and attached to the piston at the opposite end, for the transfer of fluid between the various cylinders. Thus, piston rod 39 is surrounded by a spaced sleeve 57 which is attached at its front end to piston 58 in first cylinder 38 and is closed at its opposite end, which extends rearwardly from cylinder 38 to permit attachment of tubing 59. Piston rod 39 also extends forwardly through piston 58, for transfer of fluid to or from the second cylinder. Similarly, piston rod 41 of the second cylinder 40 is surrounded by a spaced sleeve 60 which is attached at its inner end to piston 61 and is closed at its outer end, which extends forwardly from cylinder 40 to permit attachment of tubing 62. Piston rod 41 also extends rearwardly through piston 61, for transfer of fluid to or from the first cylinder, and also forwardly from the closed end of sleeve 60, to permit attachment of tubing 63. Piston rod 43 in third cylinder 42 is conveniently tubular to conserve weight and is attached at its inner end to piston 64. Although flexible hose connections to the inner end of the boom, connected respectively to piston rod 39 and tubing 59, will be necessary, because of the relative movement between the inner end of the boom and the superstructure S, all of the hydraulic connections inside the boom are between fixed points, including tubing 65 and 66 between cylinders 38 and 40 which are attached together, and tubing 62 and 63 between piston rod 41 and sleeve 60, which are connected together, and cylinder 42, which is attached to piston rod 41. Thus, tubing 59, 62, 63, 65 and 66 may be flexible hoses, if desired, but are more conveniently tubing or piping assemblies, as will be described later in connection with FIG. 4.

In the diagrammatic showing of FIG. 6, the solid arrows, such as arrows 67, represent the flow of pressure hydraulic fluid in extending the respective piston rods 39, 41 and 43, while the outline arrows, such as arrows 68, represent the flow of fluid being discharged from the respective cylinders during extension of the piston rods. For retraction of the piston rods, the flow will be in the opposite direction and reversed with respect to the arrows, i.e. pressure fluid will flow along the path of but in the opposite direction to the outline arrows 68 and fluid being discharged will flow along the path of but in the opposite direction to the solid arrows 67. Thus, it can be seen that to extend the boom sections, incoming pressure fluid passes into and through hollow piston rod 39 of first cylinder 38, as indicated by solid arrow 67, and exerts force against the outer end of cylinder 38, causing cylinder 38 to move outwardly and cylinder 40 along with it, thereby moving boom section 24 outwardly with respect to outer boom section 20. Pressure fluid also will pass from the outer end of cylinder 38 through tubing 65 to the inner end of the second cylinder 40. In the inner end of cylinder 40, the pressure fluid will exert a force on piston 61, causing the piston and piston rod 41 to move outwardly with respect to the second cylinder 40, with the third cylinder 42 moving along with the piston rod, as well as boom section 25, which is connected to the inner end of the third cylinder. Pressure fluid will also pass through piston rod 41 and through tubing 63 to the inner end of the third cylinder 42. Conveniently, tubing 63 is connected with dummy cylinder 54, to avoid interference with slide 56 of FIGS. 3 and 4, the fluid thus passing through a port 69 in the inner end of cylinder 42. As hydraulic fluid passes into the inner end of third cylinder 42 through port 69 it exerts a force on piston 64, thereby causing piston rod 43 to move outwardly with respect to the cylinder and thereby move boom section 26 outwardly, as described above.

Since fluid spaces are provided on the opposite side of each piston to retract the pistons, as described later, during extension of the boom the fluid on such side of each piston must be evacuated. Thus, as piston 64 moves outwardly, the fluid forwardly of the piston follows the path indicated by outline arrows 68, thus passing through tubing 62, connected between the outer ends of cylinder 42 and sleeve 60 for piston rod 41. The discharging fluid from cylinder 42 passes through the space between piston rod 41 and sleeve 60 and through ports 70 in the sleeve adjacent piston 61, into the space between sleeve 60 and cylinder 40. Then discharging fluid, including fluid discharged by outward movement of piston 61, flows to the outer end of cylinder 40 and through tubing 66 to the inner end of cylinder 38 and into the space between sleeve 57 and cylinder 38. Along with fluid being discharged by movement of piston 58, the discharge fluid passes through ports 71 in sleeve 57 adjacent piston 58, thence through the space between sleeve 57 and piston rod 39, for discharge through tubing 59 and to a hydraulic fluid reservoir which may conveniently be located in the superstructure S.

When the cylinder 38 and piston rods 41 and 43 are to be retracted, the flow of fluid is reversed, so that incoming pressure fluid is supplied through tubing 59 and flows through the space between sleeve 47 and piston rod 39, then through ports 71 into the space between sleeve 57 and cylinder 38, thereby exerting force on the inner end of cylinder 38 to retract it. The pressure fluid also flows to the outer end of cylinder 40 via tubing 66, exerting a force on the outer side of piston 63, causing it to be retracted. Pressure fluid also will flow inwardly through ports 70 into the space between sleeve 60 and piston rod 41, then through the sleeve and to the outer end of cylinder 42 via tubing 62 causing force to be exerted on the outer side of piston 64, to retract piston rod 43. It will be noted that it is usually unnecessary to exert as much force to retract cylinder 38 and piston rods 41 and 43, so that the reduction in the cross sectional area of pistons 58, 61 and 64 caused by the respective sleeves 57 and 60 and the tubular piston rod 43 does not materially detract from any desired speed of retraction of the boom sections.

During retraction, fluid on the opposite side of each piston is discharged from the cylinders. Thus, such fluid will flow from cylinder 42 into dummy cylinder 54 and through tubing 63 to piston rod 41, thence through the piston rod to the inner side of piston 61 and then through tubing 65 to the outer end of cylinder 38. Finally, the fluid flows through piston rod 39 and back to the reservoir, as indicated above. It will be understood that the cylinders do not necessarily operate sequentially, i.e. the first cylinder 38 will not necessarily be extended or retracted before extension or retraction of piston rod 41, nor will piston rod 41 necessarily be extended or retracted before piston rod 43, but rather, the cylinder or piston rod which encounters the least resistance will move first. Oftentimes, this will be the piston rod 43 of the third cylinder 42, since this cylinder need only move the load and the weight of inner boom section 26, while piston rod 41 must move the load and also boom sections 25 and 26, while cylinder 38 will have to move the load and boom sections 24, 25 and 26. The same situation occurs during retraction, i.e. the cylinder encounterting the least resistance will be the first to move inwardly.

As indicated above, tubing 62, 63, 65 and 66 is conveniently fixed tubing. However, for ease of production and installation, it is conveniently provided with conventional fittings and turns at each end, to reduce the bending thereof to a specific shape. Thus, as in FIG. 4, tubing 65 requires merely a slight offset, being connected at one end to cylinder 38 by a connection which comprises a pipe coupling 73 which has one end conveniently connected to a port in the end of cylinder 38 and the other end attached to a male connector 74, which is in turn connected to a nipple 75, such as ¾ inch steel, in turn connected to a union 76 carrying a nipple 75′ welded to a return 66, which reverses the direction of fluid flow and is welded to tubing 65. The opposite end of tubing 65 is conveniently welded to another return 77 whose opposite end is welded to a pipe 78 which is attached to another male connector 74, connected to a pipe coupling 73 welded to a port in the end of cylinder 40. Similarly, tubing 66 has two slight bends, as shown, and is connected at one end to cylinder 42 through an L 79 which may be threadably received or welded in a port in the side of cylinder 40 and connected to a pipe 78′ extending rearwardly along the cylinder to a union 76 joining one end of tubing 66, which extends to a point adjacent the opposite end of cylinder 38 and is there connected to another L 79 which is secured in a port in the side of the cylinder. Tubing 63 is conveniently formed in two sections disposed in parallel relation and welded to a 180° return 77, each section being connected at its opposite end to an L 79′ or 80, the latter of which is connected to a port in cylinder 42 and the former of which is connected to a port in the sleeve for piston rod 41. Tubing 62 merely extends along cylinder 42, being offset adjacent the rear end to clear slide 56 and connected to an L 81 which is attached at a port in the side of dummy cylinder 54. A connection at the opposite end of tubing 62 includes an L 81′ which is connected to a port communicating with the interior of piston rod 41 and which is connected to a nipple 82 whose opposite end is conveniently welded to a 90° welding L 83 and which, in turn, is welded to a nipple 82′ which extends downwardly and is welded to another 90° welding L 83′ adjacent the top of cylinder 42. The end of pipe 62 is welded to L 83′.

As in FIG. 5, each boom section is generally rectangular in cross section, which becomes progressively smaller from outer boom 20 to inner boom 26. The inner end of boom section 20 is conveniently provided with a collar 85 to which end cap 46 of FIGS. 1 and 2 is attached to connect piston rod 39 to boom section 20. Boom section 20 is also provided with an access opening 86 adjacent thereto, to facilitate attachment of bracket 47 to boom section 24 to interconnect cylinder 38 and boom section 24, and a second access hole 87, which corresponds with an access hole 87' in boom section 24 when the boom is in the telescoped position of FIG. 3, to facilitate attachment of bracket 55 to boom section 25, thereby interconnecting cylinder 42 with boom section 25. A bracket 88 is also attached adjacent the inner end of boom section 20, with a sleeve 89 extending therefrom and reinforced by a gusset 90, to receive pin 15 of FIGS. 1 and 2, for pivotally attaching the boom to the outer end of bracket lever L. The outer end of boom section 20 is provided with an upper reinforcing plate 91 extending to the outer end thereof and a lower reinforcing plate 92 which terminates short of the outer end. Side plates 93 are mounted on the outer end of boom section 20 and have inturned lower flanges 94 providing channels for receiving a slide plate 95 which carries a nylon or Teflon bearing plate 96, along which the next inner boom section slides. A top bearing plate 97 and side bearing plates 98, which are also conveniently made of nylon, are mounted at the front end of boom section 20 on the inside to facilitate movement of the boom section therealong. Inner circumferential ribs 99, on the inside of boom section 20, advantageously retain the bearing plates in position.

Intermediate boom sections 24 and 25 are provided with a peripheral flange 100 and 100', respectively, at the inner end and spaced forwardly therefrom a transverse top spacer bar 101 or 101', a corresponding bar on the bottom, and a pair of side plates, such as side plate 102 or 102', and a pair of side plates, such as side plate 102 or 102', for retaining a top bearing 103 or 103', side bearings 104 or 104' and a bottom bearing 105 or 105', in position. These bearings, which are preferably made of nylon or Teflon, reduce friction and thereby facilitate movement of the boom section 24 within boom section 20 and boom section 25 within boom section 26. Conveniently, bracket 47 on cylinder 38 may be bolted through side plates 102, which also reinforce the boom section at this point, after the cylinders are placed in the boom sections and this can be accomplished through access hole 86 after boom section 24 is placed in boom section 20. Similarly, bracket 55 may be bolted through side plates 102', which also reinforce the boom section at this point, access for the same being through holes 87 and 87'. The forward ends of boom sections 24 and 25 are provided with reinforcing side plates 93' and 93", respectively, each provided with inturned flanges 94' or 94", similar to side plates 93 of boom section 20, to provide channels for receiving a slide plate 95' or 95" which carries a nylon or Teflon bearing 96' and 96" for slidably supporting the next inner boom section 25 or 26. A peripheral rib, such as rib 99' or 99", is spaced inwardly from the outer end of the respective boom for retaining a top bearing 97' or 97" and side bearings 98' or 98", respectviely, which support and guide the next inner boom section 25 or 26. Boom section 25 is thus substantially identical to boom section 24, except it is somewhat narrower and of less height so that it may be telescopically received in section 24.

Boom section 26 is provided with a peripheral flange 100" at the inner end thereof and a forwardly spaced top bar 101" and side bars, such as side bar 110, which are welded thereto and retain a top bearing 103" and bearings 104", while a bottom bearing 105" is retained between a similar cross bar, not shown, and the bottom portion of flange 100". These bearings support the inner end of boom section 26 within boom section 25, for sliding movement therealong. The forward end of boom section 26 is provided with a collar 111 having at each side an access hole 112 coinciding with a hole in the boom section, which has a second access hole 113 just inwardly of collar 111. These access holes facilitate the attachment of piston rod 43 to boom section 26, as well as permitting other connections and adjustments to be made.

Figure 7:
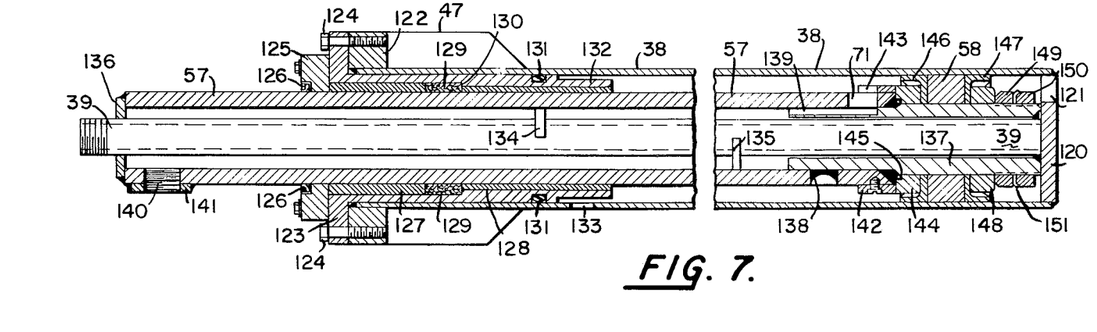
FIG. 7 is a condensed, longitudinal section of a first hydraulic cylinder.

Details of the construction of a commercially feasible first cylinder assembly, as shown in FIG. 7, include a cylindrical tube forming the cylinder 38, the outer end of which is closed by a circular plate 120 welded thereto and having an outlet opening 121 therein for attachment of pipe coupling 73 of FIG. 4 and connection of tubing 65 of FIGS. 4 and 5. Bracket 47 is attached to the inner end of cylinder 38 for attachment to boom section 24, being described in greater detail in connection with FIGS. 14–16, but generally being mounted on a plate 122 having a central circular hole in which the inner end of cylinder 38 is welded, as shown. To provide a seal around sleeve 57, a packing gland 123 having a radial flange is attached to plate 122 by cap screws 124, the gland carrying a packing adjustment plate 125 held in place by cap screws, as shown. Plate 125 is provided with an annular slot which receives a wiper seal 126 for wiping dust and other foreign matter from the piston rod as it moves into the cylinder. Sleeve 57 is slidable in a pair of bearing bushings 127 and 128, conveniently formed of bronze and separated by packing 129, with the bushings mounted in the axial flange of gland 123, the front portion of which is larger in diameter to form a shoulder 130 for holding the packing 129 in position. An O-ring 131, installed in an outer circumferential groove in the axial flange of the packing gland, prevents passage of fluid between the packing gland and cylinder. Additionally, the packing gland is provided with a neck 132 at the front end to permit passage of hydraulic fluid through a port 133, at which tubing 66 is connected, as described above in connection with FIG. 4. Piston rod 39 is also supported within sleeve 57 by a series of spaced saddles 134 and 135 which are alternated around the piston rod and are conveniently welded to piston rod 39, and then slid into sleeve 57 during assembly, prior to welding an annular plate 136, which engages piston rod 39, to the extending end of sleeve 57. A piston sleeve 137 extends through piston 58 and is provided with a reduced inner end which is received in the end of piston rod sleeve 57 and attached to sleeve 57, as by a peripheral weld at the end of sleeve 57 and additional welds placed in each of a plurality of circumferentially spaced holes 138 in sleeve 57. A longitudinal slot 139 extends from the inner end of piston sleeve 137 to provide communication with each port 71, so that fluid may flow from within sleeve 57 to the space between the sleeve and cylinder 38. The front end of piston rod 39 extends through piston sleeve 137 and is welded thereto, while the rear end of the piston rod is threaded for attachment to a flexible hose for conveying hydraulic fluid to and from the piston rod. Sleeve 57 also has a threaded hole 140 at the inner end thereof, the threads extending through a reinforcing ring 141, welded to the sleeve, as shown, to provide an opening for attachment of tubing 59 of FIG. 4, through which the hydraulic fluid passes during operation of the cylinder, as described above.

A piston retaining ring 142 is received over the outer end of sleeve 57 and is conveniently held in place by a set screw, as shown. Conveniently, the retaining ring 142 is provided with a slot 143 corresponding to each port 71 to facilitate passage of fluid from one side of sleeve 57 to the other. The retaining ring 142 also serves as a stop for a backup ring 144 received over the end of piston sleeve 57 and provided with a groove in which is placed an O-ring seal 145 which prevents leakage of fluid to the inner surface of piston 58 and associated parts. On opposite sides of piston 58 are leather cups 146 and 147, extending in opposite directions and each having an outer flange which engages the inside of cylinder 38 and extends, respectively, over back up ring 144 and a similar backup ring 148 on the opposite side of the piston, the radial flange of the respective cups being clamped against the piston by the respective backup rings. Piston 58 is conveniently formed of aluminum for weight reduction, while the outer end of piston sleeve 137 is threaded to receive a nut 149 and a lock nut 150, held in position by a lock washer 151.

Figure 8:
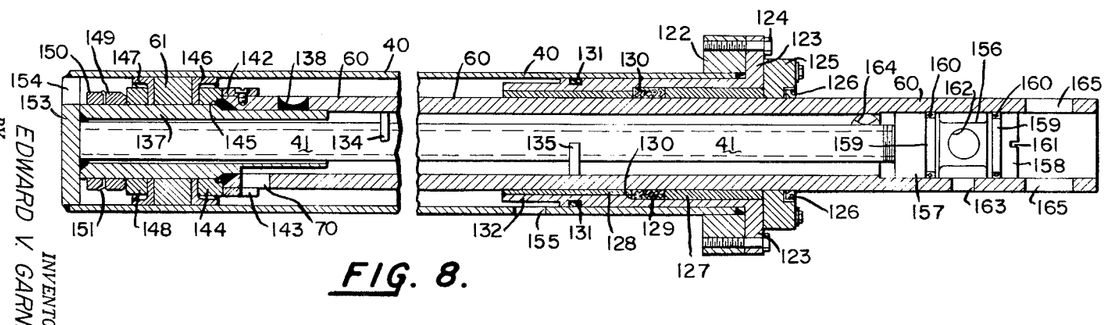
FIG. 8 is a condensed, longitudinal section of a second hydraulic cylinder.
Figure 9:
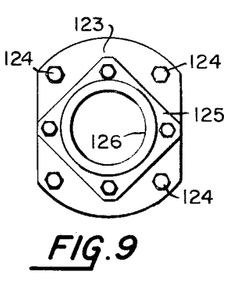
FIG. 9 is an end view of the second hydraulic cylinder of FIG. 8.

The second cylinder 40 is substantially identical to the first cylinder 38, but is reversed in direction, as shown in FIG. 8. Thus cylinder 40 is a cylindrical tube closed at the inner end by a plate 153, attached as by welding and having a hole 154 to permit attachment of hydraulic tubing 65 of FIG. 6. At the opposite end, the construction is similar to the construction at the corresponding end of cylinder 38. Thus, as shown also in FIG. 9, these parts include a plate 122 welded to the end of cylinder 40 and a packing gland 123 attached to the former by means of cap screws 124, a packing adjustment plate 125 provided with a wiper seal 126, and bearing bushings 127 and 128 spaced by packing 129. As before, the axial flange of packing gland 123 has a shoulder 130, carries an outer O-ring 131 and has a neck 132 at the inner end spaced from cylinder 38 to permit passage of hydraulic fluid through a hole 155, at which tubing 66 of FIGS. 4 and 6 is connected. Each side of plate 122 and packing gland 123 of both FIG. 7 and FIG. 8 is preferably planar, as in FIG. 9, to correspond with the inside of the rectangular boom sections. Piston rod 41 is similarly supported within sleeve 60 by alternately disposed, spaced saddles or brackets 134 and 135. The construction at the inner end of piston rod 41 and sleeve 60 is also similar to the construction at the outer end of piston rod 39 and sleeve 57. Thus, piston 61 is mounted on a piston sleeve 137 which is welded to the inner end of sleeve 60. Such construction also includes a retaining ring 142 having slots 143 to permit flow through ports 70, a backup ring 144 which carries a seal 145, oppositely directed leather cups 146 and 147, another backup ring 148, nut 149, lock nut 150 and lock washer 151.

Figure 10:
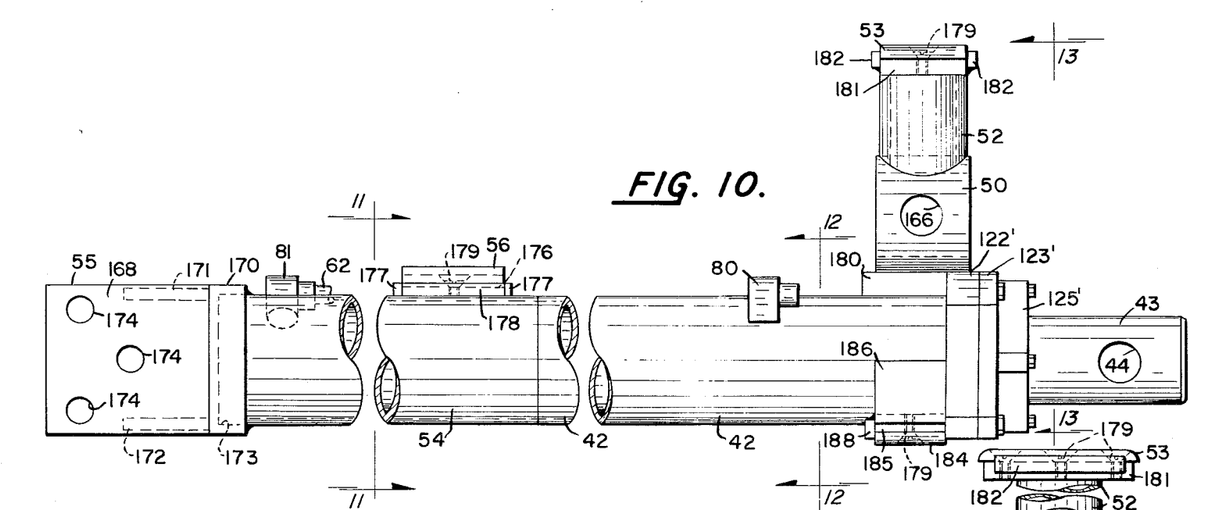
FIG. 10 is a condensed side elevation of a third hydraulic cylinder.
Figure 11:
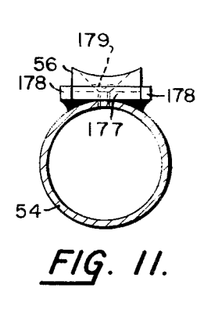
FIG. 11 is a cross section, taken along line 11—11 of FIG. 10, showing particularly a slide for the third cylinder.
Figure 12:
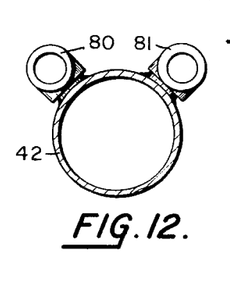
FIG. 12 is a cross section taken along line 12—12 of FIG. 10, showing a pair of hydraulic connections for the third cylinder.
Figure 13:
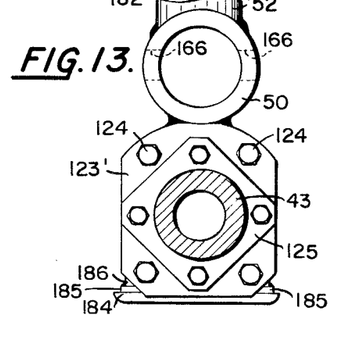
FIG. 13 is across section taken along line 13—13 of FIG. 10.

Although in the diagrammatic showing in FIG. 6, the piston rod 41 is shown as extending outwardly beyond sleeve 60 and such a construction may be utilized if desired, it is more convenient, for readier attachment of sleeve 50, to utilize the construction shown in FIG. 8, in which sleeve 60 extends beyond piston rod 41 and the outer end of piston rod 41 is threaded to receive a hollow spool 156, the enlarged ends 157 and 158 of which have similar grooves 159 for receiving O-rings 160, which prevent leakage of fluid past either end of the spool. Inner end 157 of the spool is hollow while the outer end 158 is solid and a slot 161 is conveniently provided in the outer end of the spool for receiving a tool for tightening the spool on the piston rod. The recessed center of spool 156 has a transverse hole 162 communicating with the hollow center of the spool, which also communicates with the interior of tubular piston rod 41 through hollow end 157. Advantageously, sleeve 60 is provided with a hole 163 opposite the center of spool 156 at which tubing 63 of FIGS. 4 and 6 may be connected, while sleeve 60 also has a hole 164, inwardly of spool 156, at which tubing 62 of FIGS. 4 and 6 may be connected. Oppositely disposed, transverse holes 165 extend through sleeve 60 outwardly from spool 162 for securing sleeve 50 thereto, as by a pin or bolt extending through holes 165 and also through opposed holes 166 in sleeve 50, as in FIGS. 10 and 13, so that piston rod 41 and third cylinder 42 will move together, as described above.

The construction of third cylinder piston 64 is similar to that of pistons 58 and 61, although piston rod 43 is closed rather than open at its inner end, while the internal structure of the third cylinder 42 is also similar to that of the other two cylinders, so will not be described in detail, but the exterior structure thereof is shown in FIGS. 10–13 and 17. Thus, bracket 55, by which dummy cylinder 54 is attached to boom section 25, includes, as in FIGS. 10 and 17, a pair of side plates 168 and 169 welded to a block 170 and to reinforcing gussets 171 and 172, extending between the upper and lower edges, respectively, of the side plates, as in FIG. 10. Block 170 is rectangular but has a central circular well 173 into which the end of the dummy cylinder 54 extends and is welded thereto. Conveniently, bracket 55 may be attached to boom section 25 by bolts extending through holes 174 in side plates 168 and 169 and into nuts 175 welded to the inside of the plates, as in FIG. 17, opposite the holes 174. To facilitate the sliding movement of second cylinder 40 with respect to the third cylinder 42, the dummy cylinder 54 is provided with slide 56, as indicated, which is conveniently made of a plastic such as Teflon and is mounted within a metal base formed by a bottom plate 176 above which front and rear cross bars 177 and side bars 178 extend, as in FIGS. 10 and 11, welded together and to dummy cylinder 54. Conveneintly, the Teflon slide 56 may be attached to bottom plate 176 by a screw 179 which engages a tapped hole in bottom plate 176 and the head of which is received in a central, countersunk hole in the slide. As in FIG. 12, the L's 80 and 81, for connection of tubing 63 and 62, respectively, are placed on opposite sides of the upper center of cylinder 42 and dummy cylinder 54, respectively.

At its outer end, cylinder 42 is welded to the inside of a plate 122' to which is attached a packing gland 123' by cap screws 124 and which in turn supports a packing adjustment plate 125 attached thereto by cap screws, as shown, and which may be provided with a wiper seal, as in the case of the other cylinders, to wipe dirt and other foreign matter from piston rod 43 as it moves inwardly. For attachment of sleeve 50 to cylinder 42, a narrow plate 180 is welded to the top of the cylinder, extending rearwardly from plate 122', with sleeve 50 being welded to the top of plate 180 and plate 122', as in FIG. 13. Arm 52 is conveniently tubular, being cut square across at its upper end and contoured at its lower end to fit the top of sleeve 50, to which the arm is conveniently welded. Slide 53 is flat but rounded at the outer edges, as in FIG. 13, and is supported by a plate 181 welded to the top of arm 52, being secured to plate 181 by cap screws 179 which engage tapped holes in plate 181 and the heads of which are received in countersunk holes in slide 53. To provide greater resistance to the stress imposed by the forward and rearward movement of slide 53 along the underside of the top of boom section 26, front and rear bars 182 are welded to plate 181 with the upper edges of bars 182 spaced below the top of slide 53. As in FIG. 13, the sides of packing gland 123' as well as plate 122' are planar, to correspond to the inside of boom section 26. A lower slide 184, which engages the bottom of boom section 26, is also mounted at the front end of cylinder 42 and is conveniently also formed of Teflon or other suitable material. The side edges of slide 184 are rounded upwardly, as in FIG. 13, and the slide is mounted on a plate 185, to which slide 184 is attached by cap screws 179. Plate 185 is supported by side angles 186, disposed behind the flat sides of plate 122', and a rear bar 187, these parts being welded to each other and to cylinder 42 or also plate 122'. Added resistance to the stress imposed by the forward and rearward movement of slide 184 along boom section 26 is provided by the lower edge of plate 122' and rear bar 187, which engage the front and rear edges of the slide but are spaced above the lower surface thereof. As in FIG. 10, the front end of tubular piston rod 43 is provided with aligned holes 44 for a pin or bolt by which boom section 26 and dog leg 27 of FIGS. 1 and 2 is attached thereto, as indicated previously.

Figure 14:
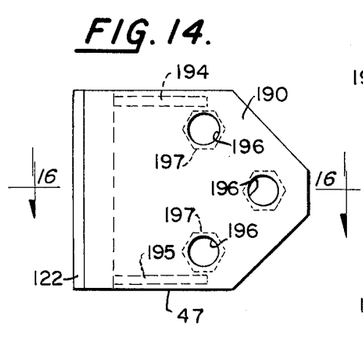
FIG. 14 is a side elevation of a bracket for attaching the first cylinder, shown in FIG. 7, to its corresponding boom section.
Figure 15:
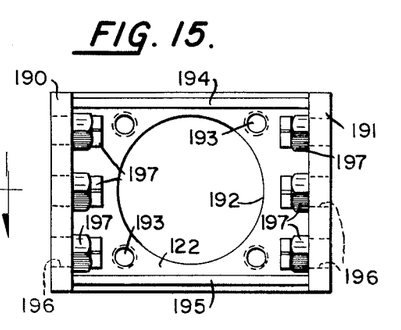
FIG. 15 is an end view of the bracket of FIG. 14.
Figure 16:
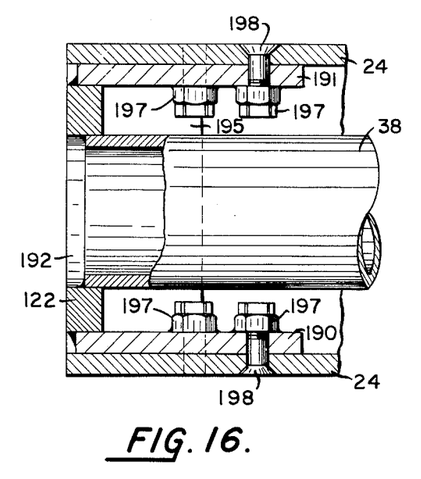
FIG. 16 is a longitudinal section, taken along line 16—16 of FIG. 14 and showing also a portion of the cylinder.
Figure 17:
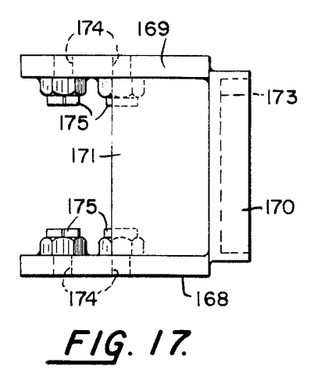
FIG. 17 is a top plan view of a bracket for attaching the third cylinder, shown in FIG. 10, to its corresponding boom section.

Bracket 47, by which the rear end of first cylinder 38 is attached to boom section 24, may be constructed as shown in FIGS. 14 and 15. Thus, bracket 47 may include a pair of side plates 190 and 191 welded to opposite sides of plate 122, which is provided with a central hole 192 for attachment of cylinder 38 by welding, as previously described, and tapped holes 193 for cap screws 124 of FIG. 7. Side plates 190 and 191 are reinforced by upper and lower gussets 194 and 195, respectively spaced above and below center hole 192 in plate 122 and welded to the side plates and the ring. Each side plate is also provided with a series of holes 196 and nuts 197 aligned with the holes and welded to the inside of each side plate. Cylinder 38 may be attached to boom 24 by bracket 47, as shown in FIG. 16, through cap screws 198 which extend through countersunk holes in the opposite sides of boom 24 and engage nuts 197, which are conveniently automatically locking nuts, such as containing a fiber or plastic ring in one end.

Figure 18:
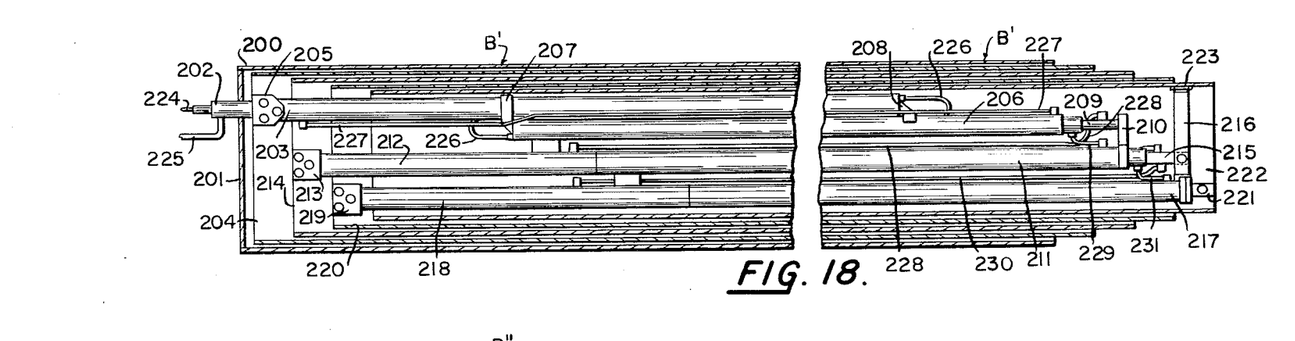
FIG. 18 is a longitudinal, condensed section, similar to FIG. 3 but illustrating an alternative boom having five sections.
Figure 19:
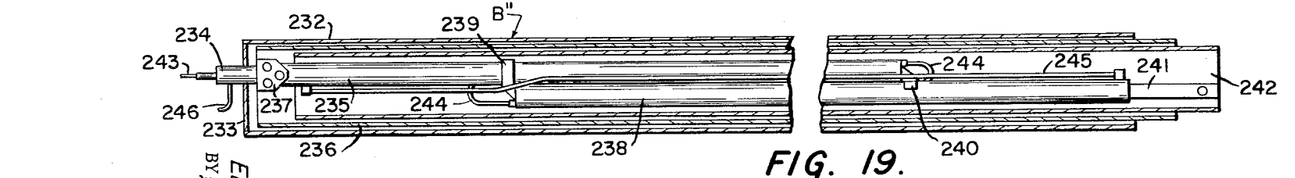
FIG. 19 is a longitudinal, condensed section, similar to FIGS. 3 and 18 but illustrating a further alternative boom having three sections.

Conveniently, a boom B' may be provided which has five telescopic sections, as in FIG. 18, or a boom B," which has three telescopic sections, as in FIG. 19, but otherwise similar to boom B. Thus, boom B' of FIG. 18 includes an outer boom section 200 having a mounting plate 201 at the inner end thereof, to which is attached a piston rod 202 extending rearwardly from a first cylinder 203. Advantageously, the inner end of the first cylinder 203 is attached to the next inner boom section 204, as by means of a bracket 205, so that, upon extension of first cylinder 203, boom section 204 will move outwardly with respect to outer boom section 200 and upon reversal of the flow of hydraulic fluid within cylinder 203, boom section 204 will move inwardly with respect to outer boom section 200. A second hydraulic cylinder 206, which is conveniently the same length as hydraulic cylinder 203 but spaced outwardly therealong, is attached to first cylinder 203, as by means of a pair of spaced brackets 207 and 208, as shown in FIG. 18. In this manner, the movement of first cylinder 203 will cause a corresponding movement of second cylinder 206. Second cylinder 206 is provided with a piston rod 209 extending outwardly therefrom and having an arm 210 attached to the outer end thereof, arm 210 being connected to the outer end of a third hydraulic cylinder 211, so that cylinder 211 will move with piston rod 209 of second cylinder 206. A dummy section 212 is connected to the inner end of third cylinder 211 and is attached at its inner end, as by means of a bracket 213, to a third boom section 214, so that upon extension of piston rod 209, boom section 214 will be moved outwardly. Third cylinder 211 is provided with a piston rod 215 extending from the outer end thereof and connected to an arm 216 which is also attached to the outer end of a fourth hydraulic cylinder 217, which is provided with an inner dummy section 218 having a bracket 219 for attachment to a fourth boom section 220. Thus, extension or retraction of piston rod 215 will cause fourth boom section 220 to move respectively outwardly and inwardly therewith. Similarly, piston rod 221 of fourth hydraulic cylinder 217 is connected to the outer end of a fifth or inner boom section 222, so that extension or retraction of piston rod 221 will cause the inner boom section to move respectively outwardly and inwardly. To facilitate this latter movement, arm 216 is provided at its opposite end with a slide 223 which engages the edge of boom section 222 and is slidable therealong to facilitate movement of boom section 222 with respect to cylinder 217 and arm 216.

As in the previous embodiment, each of the piston rods 202, 209 and 215 are conveniently hollow and also provided with sleeves through which hydraulic fluid may be respectively transferred to the opposite and near sides of the piston within the corresponding cylinder and to which the piston rods and sleeves are attached. Thus, for extending the boom, the cylinders are connected in series, with hydraulic fluid being introduced to piston rod 203 through hydraulic tubing 224 for extending cylinder 203 and fluid discharged from cylinder 203 being withdrawn through tubing 225, connected to the sleeve of piston rod 203, as in the previous embodiment. Fluid is transmitted from the outer end of the first hydraulic cylinder 203 to the inner end of the second hydraulic cylinder 206 through fixed tubing 226, to extend piston rod 209, and withdrawn from the outer end of cylinder 206 to the inner end of cylinder 203 through fixed tubing 226. Also, fluid is transmitted from piston rod 209 of the second cylinder 206 through fixed tubing 228 to dummy section 212 at the inner end of third cylinder 211, to extend piston rod 215, and withdrawn from the outer end of cylinder 211 to the sleeve of piston rod 209 through fixed tubing 229. Fluid is further transmitted from piston rod 215 of third cylinder 211 through fixed tubing 230 to dummy section 218 at the inner end of fourth hydraulic cylinder 217 to extend piston rod 221, and withdrawn from the outer end of cylinder 217 through fixed tubing 231 to the sleeve of piston rod 215 of the third cylinder. To retract the boom, fluid may be introduced to the inner side of the piston in cylinder 203 through tubing 225 and withdrawn through tubing 225. The fluid is then transmitted through tubing 227 to the outer end of second cylinder 206, through tubing 229 to the outer end of third cylinder 211, and finally, through tubing 231 to the outer end of fourth cylinder 217. Obviously, during retraction of the cylinders, fluid is withdrawn through tubing 230, 228, 226 and 224. Thus, it can be seen that this invention can easily be adapted to accommodate a boom B' having five or more sections, all but the outer section being extensible.

Similarly, this invention may be adapted for a three section telescopic boom B", as shown in FIG. 19. Thus, an outer boom section 232 may be provided with an end plate 233 to which is attached a piston rod 234 of a first hydraulic cylinder 235. Conveniently, first cylinder 235 is attached to an intermediate boom section 236 by means of a bracket 237 at the inner end thereof, for extending boom section 236 when first cylinder 235 is extended. A second hydraulic cylinder 238 is conveniently attached to first hydraulic cylinder 233, as by means of spaced brackets 239 and 240, but spaced laterally from the first cylinder, as shown, and having a piston rod 241 connected to an inner boom section 242 for extension thereof when piston rod 241 is extended. As before, each of piston rods 234 is conveniently hollow and extends through the cylinder within piston 235 and is also provided with a sleeve which communicates with the space in the cylinder, rearwardly of the piston.

Advantageously, hydraulic fluid is supplied to first cylinder 235 through hydraulic tubing 243 connected to piston rod 234 and the hydraulic fluid is transferred from the outer end of first cylinder 235 to the inner end of second cylinder 238 by means of fixed tubing 244, so that the cylinders are connected in series. Also, hydraulic fluid is returned from the outer end of second cylinder 238 to the inner end of first cylinder 235 through fixed tubing 245 and discharged through tubing 246 connected to the sleeve of piston rod 234. As will be evident, for retraction of cylinder 235 and piston rod 241, the flow of hydraulic fluid will be in the opposite direction.

Figure 20:
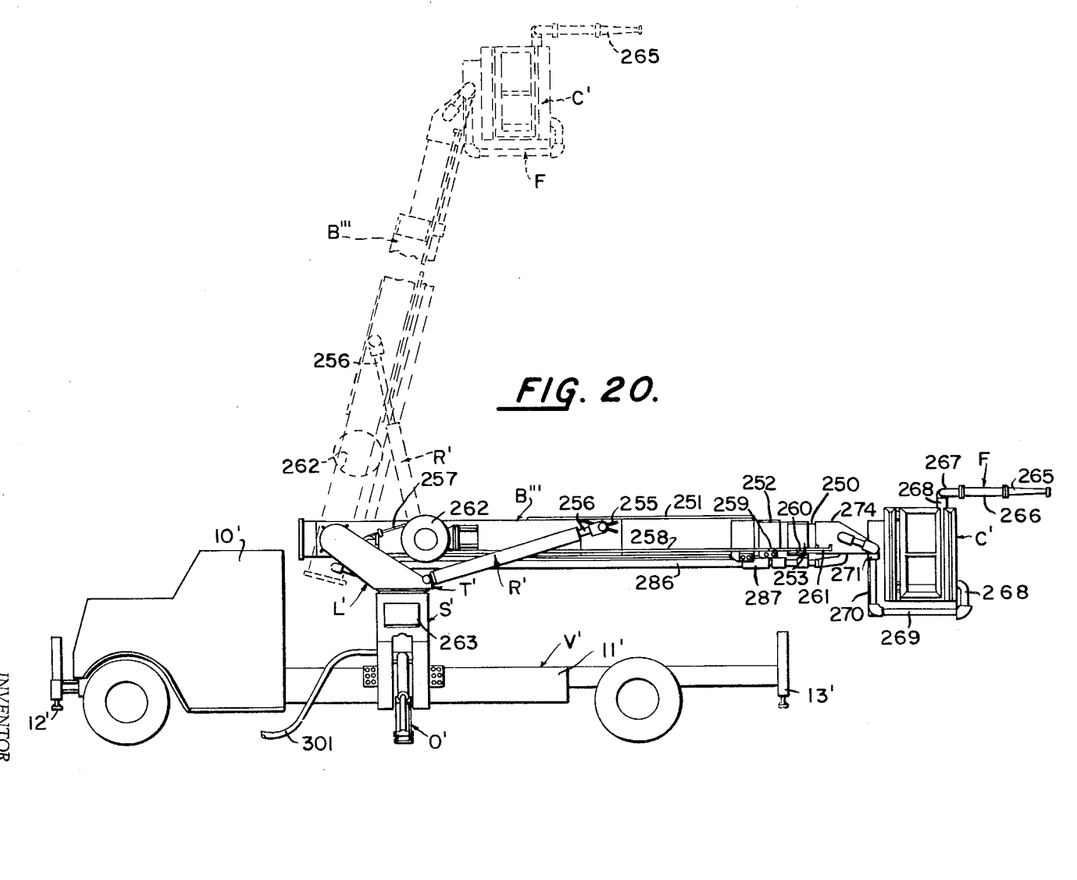
FIG. 20 is a side elevation, similar to FIG. 1, but illustrating an alternative boom provided with an extensible fire line and showing the boom in storage position in full lines and in extended position in dotted lines.
Figure 21:
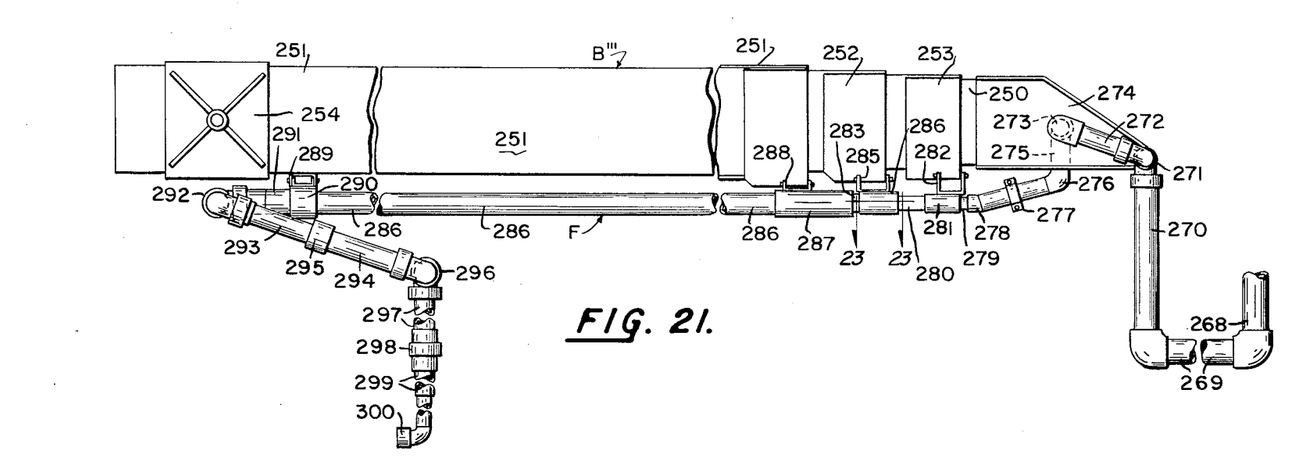
FIG. 21 is an enlarged, fragmentary, condensed slide elevation of the boom and fire line of FIG. 20.

An alternative boom B''', shown in FIGS. 20 and 21, is provided with a fire line F, shown also in FIGS. 20-23. Thus, boom B''' may be mounted on a vehicle V' having a cab 10' and a body 11'. Boom B''', shown in solid lines in storage position, is pivotally attached to a bracket L', which may be mounted in a fixed position on a rotatable turntable T', supported by a superstructure S' mounted on the vehicle. At each side, the superstructure S' is provided with an outrigger O', adapted to extend downwardly and outwardly at each side of the vehicle so as to provide lateral support for the vehicle, particularly in the event that the load is being handled at one side or the other thereof. Because boom B''' is capable of extension through a considerable distance, jack legs 12' and 13', respectively, are provided at the front and rear of vehicle V', to resist the forces exerted on the vehicle when the boom is extended either to the front or rear of the vehicle. A workman's cage C' is attached to the outer end of the inner section 250 of boom B''', shown as having four sections but which may have any desired number of sections, the outer section 251 being fixed and the inner section 250 and intermediate sections 252 and 253 being extensible. Thus, the inner end of outer boom section 251 is provided with a pivot bracket 254, as in FIG. 21, on each side for pivotal movement about bracket lever L'.

The boom is pivoted toward and away from turntable T' by a pair of hydraulic cylinder assemblies or legs R', one at each side, so that the boom may be raised or lowered to any desired angular position, such as the fully extended position shown in dotted lines. Thus, outer boom section 251 is provided adjacent its outer end, on each side, with a pivot bracket 255, as in FIG. 20, for pivotal connection to the outer end of piston rod 256 of the corresponding hydraulic leg R', whose inner end is pivotally connected to bracket L'. Intermediate boom section 252 is telescopically received in outer boom section 247, while intermediate boom section 253 is telescopically received in boom section 252 and inner boom section 250 is telescopically received in boom section 253. Conveniently, the boom may be controlled through suitable control means (not shown) mounted in cage C' and operated through a control cable 257 extending through a plurality of telescopic tubes 258, 259, 260 and 261, connected to the respective boom sections 251, 252, 253 and 250, as in FIG. 20. The other end of the cable 257 is wound on a reel 262 adjacent the inner end of boom B''', so that the cable may be paid out as the boom is extended and wound up as the boom is retracted. Cable 257 extends from the reel down through superstructure S and may be connected to a control panel 263 so that the boom B''' may also be controlled from the ground.

The fire line F conveniently comprises a nozzle 265 which is attached to the end of a pipe connection 266 connected to a swivel joint 268 so that the nozzle may be directed upwardly or downwardly or from side to side as desired. In turn, swivel 267 is pivoted on a pipe 268, extending downwardly inside cage C', and generally S-shaped at the lower end, so as to extend outwardly at the bottom of the cage and then downwardly, as in FIG. 20, being connected to a horizontal pipe 269 which extends beneath the cage. The other end of pipe 269 is connected to a vertical pipe 270 which extends upwardly along the inner side of cage C' and the upper end of which is connected to a swivel joint 271 which permits the piping to pivot with cage C' when the boom B''' is raised and lowered. Swivel 271 is in turn connected to a diagonally extending pipe 272 connected to a laterally extending pipe 273, which extends through the web of a flanged bracket 274 mounted on the outer end of inner boom section 250, as in FIG. 21, and on which cage C' is mounted, as in FIG. 20. Pipe 273 is connected to a downwardly extending pipe 275 having at the lower end a rearwardly extending elbow 276, as in FIG. 21. Conveniently, elbow 276 is connected to a union 277, to facilitate installation, in turn connected by an angular coupling 278 to the outer end of a telescoping pipe 279, adapted to slide within a second telescoping pipe 280 having a packing gland 281 at its outer end. Through lateral pipe 273 mounted in bracket 274, pipe 279 is extendable and retractable with outer boom section 250, while packing gland 281 is mounted beneath the outer end of boom section 253, as by a bracket 282, so that pipe 280 is extendable and retractable along with boom section 253. Similarly, pipe 280 is telescopically received within a telescopic pipe 283 provided at its outer end with a packing gland 284, which is mounted on the underside of boom section 252, as by a bracket 285, so that pipe 283 is extendable and retractable along with boom section 252. Similarly, pipe 283 is telescopically received in a pipe 286, the outer end of which is provided with a packing gland 287 which is attached to the underside of boom section 251, as by a bracket 288. The rear end of pipe 287 is attached to the underside of boom section 251, as by means of a bracket 289 attached to a strap 290 extending around pipe 286. Through the piping arrangement shown, the telescoping pipes 279, 280, 283 and 286 extend along the underside of the boom, in a position off center, but underneath the boom so as to avoid interference with or being struck by either hydraulic leg R', which are disposed at each side of the boom. The rear end of pipe 286 also conveniently terminates directly beneath the pivot point of trunnion 254, as in FIG. 21, to reduce the amount of movement of the connection thereto, which accommodates upward and downward as well as lateral movement of the boom.

Figures 22, 23:
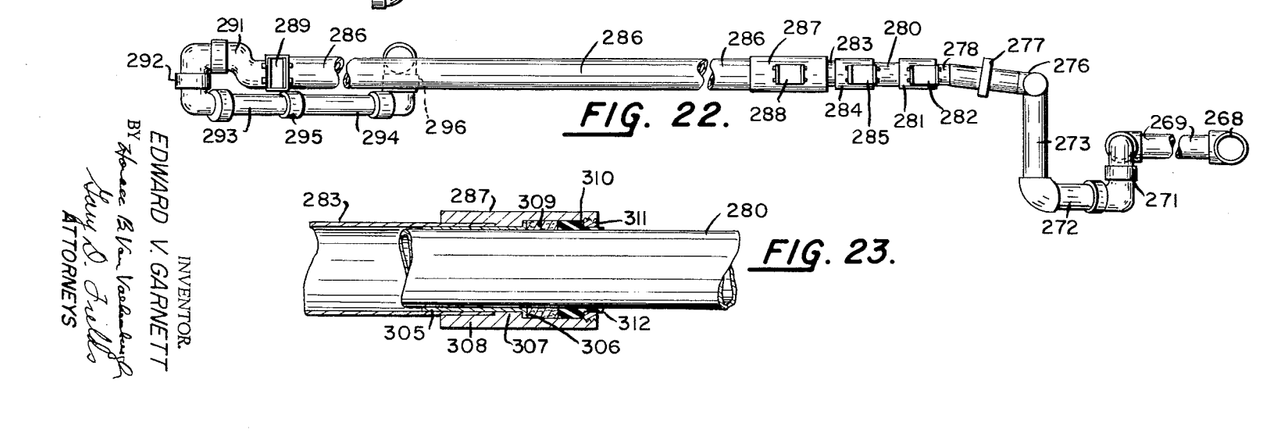
FIG. 22 is a condensed, top plan view of the fire line of FIG. 21.
FIG. 23 is an enlarged, fragmentary, longitudinal section of a pipe coupling of the fire line of FIGS. 21 and 22.

Advantageously, the inner end of pipe 286 is connected by an offset nipple 291, as in FIGS. 22 and 23, with a swivel joint 292 which has a 180° bend therein. Swivel joint 292 is connected to a pipe 293 telescopically received in a pipe 294 having a slip joint or packing gland 295 on the end thereof. Conveniently, the opposite end of pipe 294 is connected to a second swivel joint 296, normally having a 180° bend therein, but turned to the position shown. Swivel joint 296 is connected to the upper end of a vertical pipe 297 extending downwardly through the superstructure S and connected to a straight swivel joint 298, which in turn is connected to the upper end of a vertical pipe 299, which is mounted in fixed position in superstructure S'. Vertical pipe 299 is provided at its lower end with an elbow connector 300, which may be connected to a fire hose, such as fire hose 301 of FIG. 20, which in turn is connected to a fire hydrant or other suitable supply of water.

As will be evident, fire line F may be utilized with telescopic boom B''', being provided with telescoping pipes 279, 280, 283 and 286, which may be telescopically extended and retracted so that the boom water may be directed to any desired point on a fire. Also, with the seivel and slip joint arrangement provided adjacent and within superstructure S', the connection for fire line F may pivot upwardly and downwardly about swivel joints 292 and 296 while pipe 293 may move inwardly or outwardly in pipe 294. Furthermore, swivel joint 298 permits horizontal movement of the fire line connection.

The slip joints or packing glands for the telescopic pipes may be similar in construction, such as the slip joint or packing gland for pipe 280 illustrated in FIG. 23. The outer end of pipe 283, into which pipe 280 telescopes, is conveniently provided with a sleeve bearing 305 for pipe 280, having at its outer end a flange 306 abutting an inwardly extending flange 307 of an outer sleeve 308 of packing gland 287, which is attached to pipe 283, with inner flange 307 abutting the outer end thereof, in a suitable manner, as by a sweat joint. Sleeve 308 receives a packing 309 held in place by means of a wiper 310 and a nut 311, which engages inside threads at the outer end of sleeve 308. Wiper 310 is conveniently formed of rubber or other suitable material and is conveniently provided with an axial flange 312 which extends through nut 311 to provide a maximum area for removing sand or other material from the outside of pipe 280, as it enters the packing gland, to prevent damage to bearing 305. Thus, pipe 280 may slide longitudinally within pipe 283 and water will be prevented from leaking by packing 309, which may be conventional. It will be understood that the packing gland or slip joint for each pair of telescopic pipes may be identical in structure, merely varying in size from the larger pipes to the smaller ones.

As will be evident, a telescopic boom constructed in accordance with this invention fulfills to a marked degree the requirements and objects hereinbefore set forth. Such a boom has been provided which includes two or more telescopic stages. Furthermore, a boom has been provided which is operated through hydraulic cylinders connected together in such a manner that all hydraulic connections within the boom are between points fixed with respect to each other. A hydraulic cylinder assembly is provided which will fit within the innermost boom section, yet each of the boom sections, except the outermost, is moved outwardly by either a cylinder or a piston rod. Such an assembly is unique in the attachment of the first and second cylinders together and the attachment of the third cylinder to the piston rod of the second cylinder. In addition, each cylinder is of novel construction wherein the fluid which extends the cylinder is directed through the center of the piston rod to the opposite side of the piston, while the outlet fluid is directed from the interior of a sleeve surrounding the piston rod to the area between the sleeve and the cylinder and then expelled. Since the cylinders are all connected in series, a similar force tends to be exerted in each cylinder during both extension and retraction. Additionally, novel control means are provided for operating the boom from a basket on the end thereof. In one embodiment, a telescopic fire line is mounted on the boom and supplied with water under pressure through piping in the superstructure. Advantageously, the fire line includes a novel slip joint and swivel arrangement to facilitate movement with the boom and a nozzle mounted on a workmen's cage at the outer end of the boom, so that water may be directed to any point on a fire.

Although several embodiments of this invention have been illustrated and described, it will be understood that other embodiments may exist and various changes and variations made without departing from the spirit and scope of this invention.

What is claimed is:

1. An extensible boom for a derrick adapted to be mounted on a vehicle, including at least an outer boom section; an intermediate boom section telescopically received in said outer boom section; an inner boom section telescopically received in said intermediate boom section; first and second hydraulic cylinders within and operatively connected to said boom sections; each said cylinder having a piston rod, with the piston rod of said first cylinder extending inwardly therefrom and the piston rod of said second cylinder extending outwardly therefrom; means connecting the piston rod of said first cylinder to the inner end of said outer boom section; means connecting the inner end of said first cylinder to the inner end of said intermediate boom section; means connecting said second cylinder to said first cylinder; means connecting the piston rod extending from the outer end of said second cylinder to the outer end of said inner boom section; and hydraulic fluid means interconnecting said cylinders for extending and retracting said inner and intermediate boom sections.

2. An extnsible boom, as set forth in claim 1, wherein the piston rods of said first and second cylinders include a piston; a hollow piston rod extending through said piston; a sleeve surrounding said piston rod; a first port in said sleeve adjacent said piston; and a second port in said sleeve adjacent the end of said sleeve opposite said piston and exteriorly of said cylinder.

3. An extensible boom, as set forth in claim 1, including separate hydraulic conduits connected to the inner end of each of said piston rod and sleeve of said first cylinder for supplying and removing hydraulic fluid; fixed hydraulic conduit means connected between the outer end of said first cylinder and the inner end of said second cylinder; and fixed hydraulic means connected between the inner end of said first cylinder and the outer end of said second cylinder.

4. An extensible boom for a derrick adapted to be mounted on a vehicle, including at least an outer boom section; a first intermediate boom section telescopically received in said outer boom section; a second intermediate boom section telescopically received in said first intermediate boom section; an inner boom section telescopically received in said second intermediate boom section; first, second and third hydraulic cylinders within and operatively connected to said boom sections; each said cylinder including a piston rod, with the piston rod of said first cylinder extending inwardly therefrom and the piston rods of said second and third cylinders extending outwardly therefrom; means connecting the piston rod of said first cylinder to the inner end of said outer boom section; means connecting the inner end of said first cylinder to the inner end of said first intermediate boom section; means connecting said second cylinder to said first cylinder; means connecting the piston rod extending from the outer end of said second cylinder to the outer end of said third cylinder; means connecting the piston rod extending from the outer end of said third cylinder to the outer end of said inner boom section; means connecting the inner end of said third cylinder to the inner end of said intermediate boom section; and hydraulic fluid means interconnecting said cylinders for extending and returning said inner and intermediate boom sections.

5. An extensible boom, as set forth in claim 4, wherein said third cylinder is provided at its inner end with a dummy cylinder as an extension thereof, the inner end of said dummy cylinder being connected to the inner end of said second intermediate boom section, whereby all said hydraulic cylinders have approximately the same length.

6. An extensible boom, as set forth in claim 5, including a slide between the inner end of said second cylinder and said extension of said third cylinder to permit relative movement therebetween.

7. An extensible boom, as set forth in claim 4, including bearing means slidably supporting the outer end of said piston rod of said second cylinder and the outer end of said third cylinder in said inner boom section.

8. An extensible boom, as set forth in claim 4, including at least one access hole at the inner end of said outer boom section and said first intermediate boom section, to facilitate attachment of said cylinders.

9. An extensible boom, as set forth in claim 4, wherein said boom sections are rectangular in cross section; the inside of the outer end of said outer end intermediate boom sections are provided with flat bearings engaging the outside of the next inner boom section; and the outside of the inner end of said intermediate and inner boom sections are provided with flat bearings engaging the inside of the next outer boom sections.

10. An extensible boom, as set forth in claim 4, wherein the piston rods of said first and second cylinders include a piston; a hollow piston rod extending through said piston; a sleeve surrounding said piston rod; a first port in said sleeve adjacent said piston; and a second port in said sleeve adjacent the end of said sleeve opposite said piston and exteriorly of said cylinder.

11. An extensible boom, as set forth in claim 10, including separate hydraulic conduits connected to the inner end of each of said piston rod and sleeve of said first cylinder for supplying and removing hydraulic fluid; fixed hydraulic conduit means connected between the outer end of said first cylinder and the inner end of said second cylinder; fixed hydraulic conduit means connected between the inner end of said first cylinder and the outer end of said second cylinder; fixed hydraulic conduit means connected between the outer end of said third cylinder and the outer end of said sleeve of said second cylinder; and fixed hydraulic conduit means connected between the inner end of said third cylinder and the outer end of said piston rod of said second cylinder.

12. An extensible boom, as set forth in claim 4, including a workman's cage attached to the outer end of said inner boom section; and control means in said basket for controlling said derrick.

13. An extensible boom, as set forth in claim 12, including a control cable extending from said basket to the inner end of said outer boom section; a reel attached to the inner end of said boom for winding said cable when said boom sections are retracted; and telescopic tubes mounted on said boom sections through which said cable extends.

14. An extensible boom for a derrick adapted to be mounted on a vehicle, including an outer boom section; a first intermediate boom section telescopically received in said outer boom section; a second intermediate boom section telescopically received in said first intermediate boom section; a third intermediate boom section telescopically received in said second intermediate boom section; an inner boom section telescopically received in said third intermediate boom section; first, second, third and fourth hydraulic cylinders within and operatively connected to said boom sections; each said cylinder having a piston rod, with the piston rod of said first cylinder extending inwardly therefrom and the piston rods of said second, third and fourth cylinders extending outwardly therefrom; and including means connecting the piston rod of said first cylinder to the inner end of said outer boom section; means connecting the inner end of said first cylinder to the inner end of said first intermediate boom section; means connecting said second cylinder to said first cylinder, means connecting the piston rod extending from the outer end of said second cylinder to the outer end of said third cylinder, means connecting the inner end of said third cylinder to the inner end of said second intermediate boom section; means connecting the piston rod extending from the outer end of said third cylinder to the outer end of said fourth cylinder; means connecting the inner end of said fourth cylinder to the inner end of said third intermediate boom section; means connecting the piston rod extending from the outer end of said fourth cylinder to the outer end of said inner boom section; and hydraulic fluid means interconnecting said cylinders for extending and retracting said inner and intermediate boom sections.

15. An extensible boom, as set forth in claim 14, wherein said third and fourth cylinders each are provided at their inner ends with a dummy cylinder as an extension thereof, the inner end of the dummy cylinder of said third cylinder being connected to the inner end of said second intermediate boom section and the inner end of the dummy cylinder of said fourth cylinder being connected to the inner end of said third intermediate boom section, whereby all said hydraulic cylinders have approximately the same length.

16. An extensible boom, as set forth in claim 15, including a first slide between the inner end of said second cylinder and said extension of said third cylinder to permit relative movement therebetween; and a second slide between the inner end of said third cylinder and said extension of said fourth cylinder to permit relative movement therebetween.

17. An extensible boom, as set forth in claim 14, including bearing means slidably supporting the outer end of said third piston rod of said third cylinder and the outer end of said fourth cylinder in said inner boom section.

18. An extensible boom, as set forth in claim 14, wherein said boom has means for supplying water to the end of said boom including telescopic pipe sections corresponding to said boom sections and being respectively attached thereto; seal means at the forward end of each said pipe sections for slidably engaging the next inner pipe section; each said seal means including an inner sleeve bearing received in the outer end of a pipe section and having an outer peripheral flange; an outer sleeve extending over said pipe section having an inner flange engaging the inner edge of said peripheral flange; a packing abutting the outer edge of said peripheral flange; a wiper abutting said packing; a nut threadably received in the outer end of said outer sleeve holding said wiper in position; and swivel means connected to the outer pipe section for connection to a source of water and permitting relative movement of said boom.

19. An hydraulic cylinder adapted for use in a telescopic beam assembly comprising a cylindrical compression chamber; an orifice in the end of said compression chamber; a piston movable within said compression chamber; a hollow piston rod attached to said piston and extending therethrough; a sleeve extending around said piston rod, the inner end of said sleeve being connected to said piston and the outer end of said sleeve extending from said chamber; a piston sleeve extending through said piston and attached thereto, one end of said piston sleeve being attached to said piston rod sleeve and the opposite end thereof being attached to said piston rod, and said piston sleeve including a slot corresponding in position to said first orifice of said piston rod sleeve; an end plate closing the outer end of said sleeve and engaging said piston rod; a first orifice in said sleeve adjacent said piston; and a second orifice in said sleeve adjacent said end plate.

20. An hydraulic cylinder, as set forth in claim 19, wherein said piston includes a cylindrical piston block mounted on said piston sleeve; a flanged cup mounted on each side of said block with the flange of each extending away from said block; a spacer mounted within each said cup; a stop ring mounted on said piston rod sleeve, preventing inward movement of the inner spacer; and means mounted on the outer end of said piston sleeve for preventing outward movement of the adjacent spacer.

21. An hydraulic cylinder, as set forth in claim 19, wherein a spool is threadably received on the end of said piston rod opposite said piston and includes a reduced portion having a transverse hole therethrough for permitting flow of fluid from said piston rod into said reduced area; and an orifice in said piston rod sleeve adjacent said sleeve to permit the flow of fluid out of said sleeve.

References Cited by the Examiner

UNITED STATES PATENTS

| | | | |
|---|---|---|---|
| 321,342 | 6/85 | Covert | 182—51 |
| 2,538,842 | 1/51 | McFarland | 92—175 |
| 2,666,417 | 1/54 | Harsch | 182—2 |
| 2,682,432 | 6/54 | Schmidt | 182—2 |
| 2,787,383 | 4/57 | Antos | 212—35 |
| 2,928,493 | 3/60 | Clements | 182—2 |
| 2,936,847 | 5/60 | Etiel | 182—2 |
| 3,011,845 | 12/61 | Watt. | |
| 3,038,448 | 6/62 | Corwin | 121—38 |
| 3,040,712 | 6/62 | Harrah | 121—38 |
| 3,044,451 | 7/62 | Morrison | 121—38 |
| 3,046,062 | 7/62 | Wettstein. | |

HARRISON R. MOSELEY, *Primary Examiner.*

CHARLES E. O'CONNELL, REINALDO P. MACHADO, *Examiners.*